US012625788B1

(12) United States Patent
Duale et al.

(10) Patent No.: US 12,625,788 B1
(45) Date of Patent: May 12, 2026

(54) METHOD FOR TESTING ARTIFICIAL INTELLIGENCE UNITS LOCATED ACROSS SEPARATE PROCESSING CHIPS

(71) Applicant: International Business Machines Corporation, Armonk, NY (US)

(72) Inventors: Ali Y. Duale, Poughkeepsie, NY (US); Patrick Duffy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 37 days.

(21) Appl. No.: 18/966,790

(22) Filed: Dec. 3, 2024

(51) Int. Cl.
 G06F 11/22 (2006.01)
 G06F 11/263 (2006.01)
(52) U.S. Cl.
 CPC ........ G06F 11/2236 (2013.01); G06F 11/263 (2013.01)
(58) Field of Classification Search
 None
 See application file for complete search history.

(56) References Cited

U.S. PATENT DOCUMENTS

| | | | | |
|---|---|---|---|---|
| 8,738,860 B1 * | 5/2014 | Griffin | ................ | G06F 12/0897 |
| | | | | 711/122 |
| 9,639,487 B1 * | 5/2017 | Wentzlaff | .............. | H04L 49/109 |
| 10,776,696 B2 | 9/2020 | Katz et al. | | |
| 11,699,295 B1 | 7/2023 | Cosic | | |
| 12,468,444 B2 | 11/2025 | Duale et al. | | |

| | | | | |
|---|---|---|---|---|
| 2023/0036117 A1 * | 2/2023 | Krishnani | ........... | G06F 11/0757 |
| 2024/0273411 A1 * | 8/2024 | Mueck | ................... | H04L 9/3263 |
| 2025/0054008 A1 * | 2/2025 | Cella | ..................... | G06N 5/043 |

(Continued)

FOREIGN PATENT DOCUMENTS

DE      112020007444 T5      6/2023

OTHER PUBLICATIONS

O. P. Gangwal, A. Nieuwland and P. Lippens, "A scalable and flexible data synchronization scheme for embedded HW-SW shared-memory systems," International Symposium on System Synthesis (IEEE Cat. No. 01EX526), Montreal, QC, Canada, 2001, pp. 1-6, (Year: 2001).*

(Continued)

*Primary Examiner* — Daniel F. McMahon
(74) *Attorney, Agent, or Firm* — CANTOR COLBURN LLP; Edward Wixted

(57) ABSTRACT

A method for testing artificial intelligence units (AIUs) located across separate processing chips is disclosed. The method provides the right test environment and test cases that stress remote AIU usages. The test cases include multiple machine instruction streams built to be executed on AIUs located on different processing chips. These test instruction streams include AIU primitives that may be executed on local or remote AIUs. The insertion of AIU primitives in each instruction stream is based on a random selection. This randomness allows concentration of AIU primitives in instruction streams built for processor cores of one processing chip while instruction streams running on another processing chip may lack AIU primitives, and as a result, the AIU on that processing chip may become idle. The test cases also cause different AIUs on different processing chips to compete for resources such as input and output data buffers.

20 Claims, 7 Drawing Sheets

100

(56)                    References Cited

U.S. PATENT DOCUMENTS

2025/0272777 A1 *    8/2025    Ray ............................ G06T 1/20
2025/0291602 A1 *    9/2025    Gadre ................. G06F 9/30043

OTHER PUBLICATIONS

Anonymous, "DevOps Robotic Process Automation and Artificial Intelligence Remediation," IPCOM000264994D, IP.com, Feb. 16, 2021, 7 pages.
Anonymous, "Automated Portability Issue Detection in Applications Using AI Methods," IPCOM000269964D, IP.com, May 27, 2022, 4 pages.
Anonymous, "Machine-Learning-Based Test Priority Suggestion Using Textual Features and Code Coverage Labels," IPCOM000266167D, IP.com, Jun. 17, 2021, 10 pages.
Anonymous, "Regulatory Compliance Checking with Automated AI Software Assessment," IPCOM000270510D, IP.com, Jul. 13, 2022, 5 pages.
Moore, L. et al., "An Introduction To Risc-V Processor Verification Techniques," RISC-V Summit, Imperas, 2022, 56 pages.
Wyrwas, E., "Nepp Processor Enclave: Testing Artificial Intelligence & Machine Learning", NASA Electronic Parts and Packaging (NEPP) Program, NEPP Electronics Technology Workshop (ETW), Greenbelt, MD, Jun. 15-18, 2020, 34 pages.

* cited by examiner

METHOD FOR TESTING ARTIFICIAL INTELLIGENCE UNITS LOCATED ACROSS SEPARATE PROCESSING CHIPS

TECHNICAL FIELD

The invention relates to system-level testing in general, and in particular, to a method and system for testing artificial intelligence units located across separate processing chips.

BACKGROUND

A modern data processing system may include multiple processing chips, with each processing chip having a set of processor cores coupled to an artificial intelligence unit (AIU). The AIU functions to handle requests from the processor cores. When there are multiple AIU primitives for an AIU within a processing chip to execute, only one single AIU primitive can access the AIU on that processing chip while the remaining AIU primitives have to wait for their turn. This kind of serial execution tends to reduce the overall system efficiency.

As such, several methods have developed to take advantage of an idle AIU located on a separate (remote) processing chip within a data processing system. For example, some of the AIU primitives in queue of a first processing chip within a data processing system may be dispatched to an AIU located within a second processing chip within the same data processing system for execution. Due to the nature of AIUs, it is possible for a single AIU instance to be interrupted multiple times and later resume execution on a different AIU located on a different processing chip.

From a testing and verification standpoint, it is relatively straightforward to verify the integrity of function codes employed by the above-mentioned serial execution method. However, when more than one AIU is involved with each AIU being on a separate processing chip, the verification of the function codes for handling the execution of multiple AIU primitives across multiple AIUs can become much more complicated. The detection of remote AIU execution, as well as monitoring the usage of these remote AIUs, adds to the challenges of the validation of design correctness. Thus, a correct test environment needs to be developed for testing remote AIU usages, and for validating the correctness of the AIU behavior.

SUMMARY

The present disclosure provides an improved method for testing the function codes that are utilized to perform the execution of multiple AIU primitives in multiple AIUs located across separate chips.

In accordance with one embodiment of the present invention, a testing system is associated to a first processing chip and a second processing chip. The first processing chip includes a first AIU and a first set of processor cores. The second processing chip includes a second AIU and a second set of processor cores. The memories within the first and second processing chips are combined and re-allocated as a set of private buffers, a shared memory space for inputs, and a shared memory space for outputs. Multiple instruction streams are generated for the first and second processing chips, and each instruction stream may contain one or more AIU primitives within instruction streams is executed by one of the AIUs. The instruction streams as well as the data that the AIUs operate on are built such that the same AIU primitives are operated by different chips using same input data for each test case build. Afterwards, the results of the execution of the one AIU primitive are written into a first location of the shared memory space for outputs. The contents stored in the first location of the shared memory space for outputs are then copied to a second location of one of the private buffer reserved for the AIU that has executed the one AIU primitive. Subsequently, the contents in the first location of the shared memory space for outputs are read at a random time. A determination is made whether or not the contents read from the first location of the shared memory space for outputs matches the contents stored in the second location of the one private buffer. If the contents read from the first location of the shared memory space for outputs do not match the contents stored in the second location of the one private buffer, an error is flagged.

Figure 1:
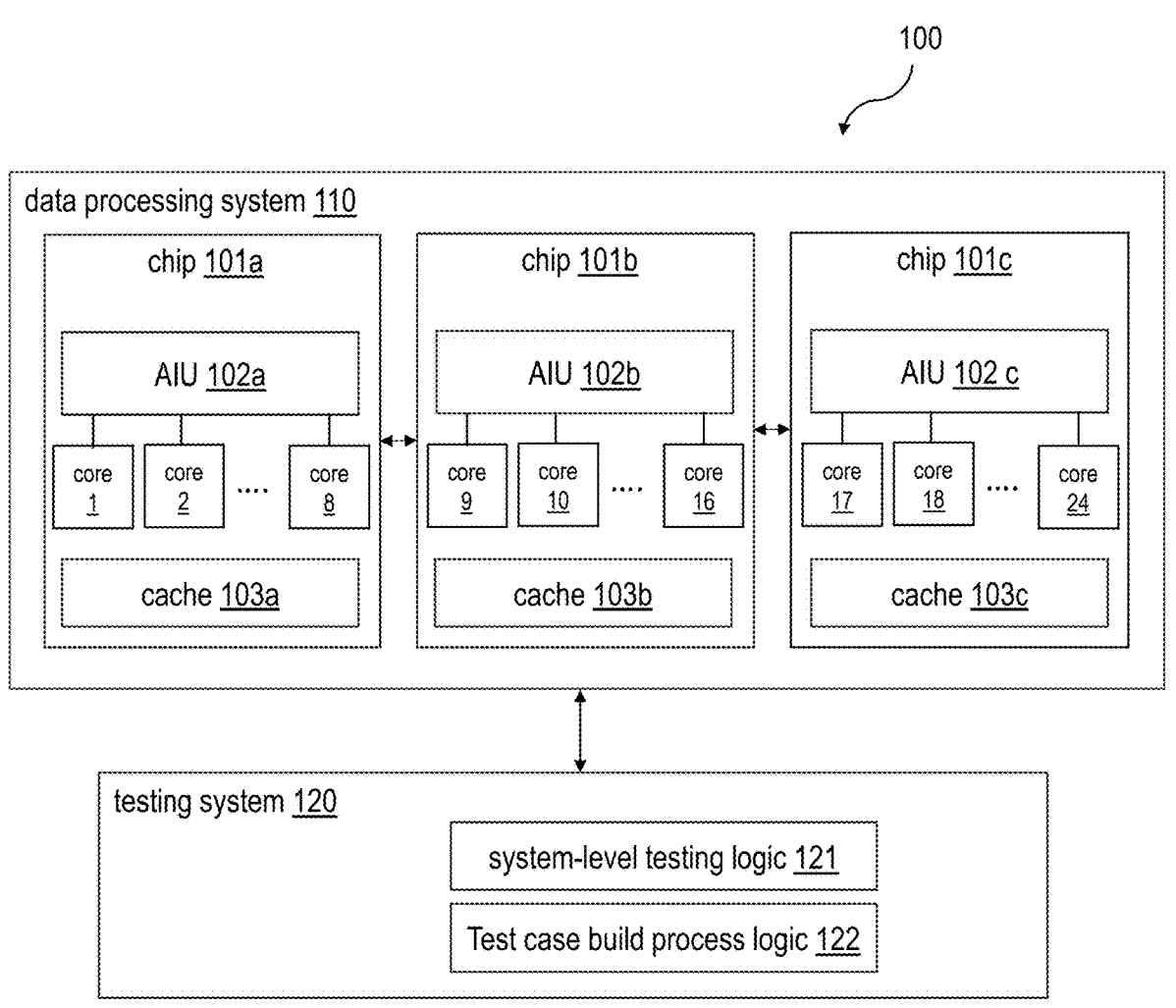
FIG. 1 is a block diagram of a test environment for testing artificial intelligence units located across separate processing chips, according to one embodiment of the present invention.

In accordance with common practice, various features illustrated in the drawings may not be drawn to scale. Accordingly, dimensions of the various features may be arbitrarily expanded or reduced for clarity. In addition, some of the drawings may not depict all of the components of a given system, method, or device. Finally, like reference numerals may be used to denote like or corresponding features in the specification and figures.

DETAILED DESCRIPTION

Referring now to the drawings, and in particular to FIG. 1, there is illustrated a block diagram of a test environment for testing artificial intelligence units (AIUs) located across separate processing chips, according to one embodiment of the present invention. As shown, a test environment 100 includes a data processing system 110 and a testing system 120 for performing system-level testing on data processing system 110. In this example, data processing system 110 includes three processing chips 101a-101c. Processing chip 101a includes an AIU 102a, a set of processor cores 1-8, and a cache 103a. Similarly, processing chip 101b includes an AIU 102b, a set of processor cores 9-16, and a cache 103b; processing chip 101c includes an AIU 102c, a set of processor cores 17-24, and a cache 103c.

Testing system 120 includes system-level testing logic 121 for testing AIU hardware and AIU primitives. Testing system 120 also includes test case build process logic 122. For the present embodiment, testing system 120 is utilized to verify the function codes for handling the execution of AIU primitives in AIUs 102a-102c located in processing chips 101a-101c, respectively.

Figure 2:
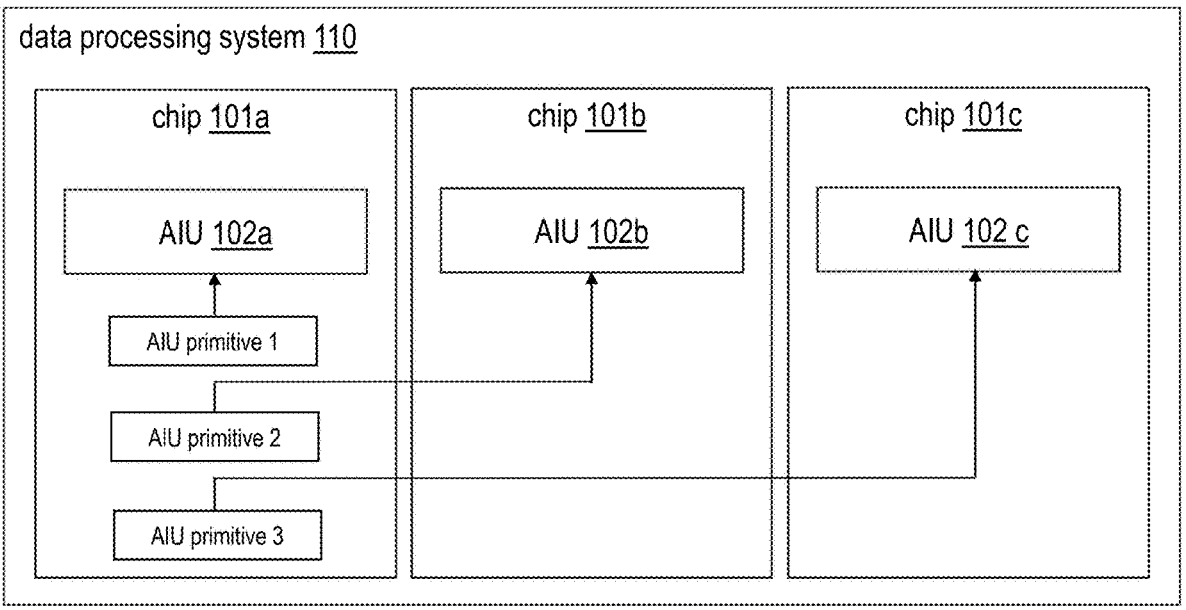
FIG. 2 is a block diagram illustrating a scenario that needs to be tested and verified by a testing system within the test environment of FIG. 1.

With reference now to FIG. 2, there is depicted a scenario that needs to be tested and verified by testing system 120. As shown, AIU primitive 1, AIU primitive 2 and AIU primitive 3 are all initiated by some of processor cores 1-8 within processing chip 101*a*, and are supposed to be handled by AIU 102*a* within processing chip 101*a*. However, since AIU 102*a* can only process one AIU primitive at a time, AIU primitive 2 and AIU primitive 3 would have to wait for their turn while AIU primitive 1 is being processed by AIU 102*a*. This serial method of processing AIU primitives reduces the overall system performance significantly. Thus, it would be beneficial to dispatch AIU primitive 2 to AIU 102*b* located in processing chip 101*b*, and AIU primitive 3 to AIU 102*c* located in processing chip 101*c* for processing, especially when AIU 102*b* and AIU 102*c* are idle at the time. It will be a great performance improvement when AIU primitive 2 and AIU primitive 3 can be processed by AIU 102*b* located in processing chip 101*b* and AIU 103*c* located in processing chip 101*c*, respectively, while AIU primitive 1 is being processed by AIU 102*a* located in processing chip 101*a*, all at the same time.

However, when AIUs 102*a*-102*c* are located on separate chips 101*a*-101*c*, respectively, the verification of the function codes for handling the execution of multiple AIU primitives in separate processing chips 101*a*-101*c* are not easy, and several testing methodologies needed to be employed.

Figure 3:
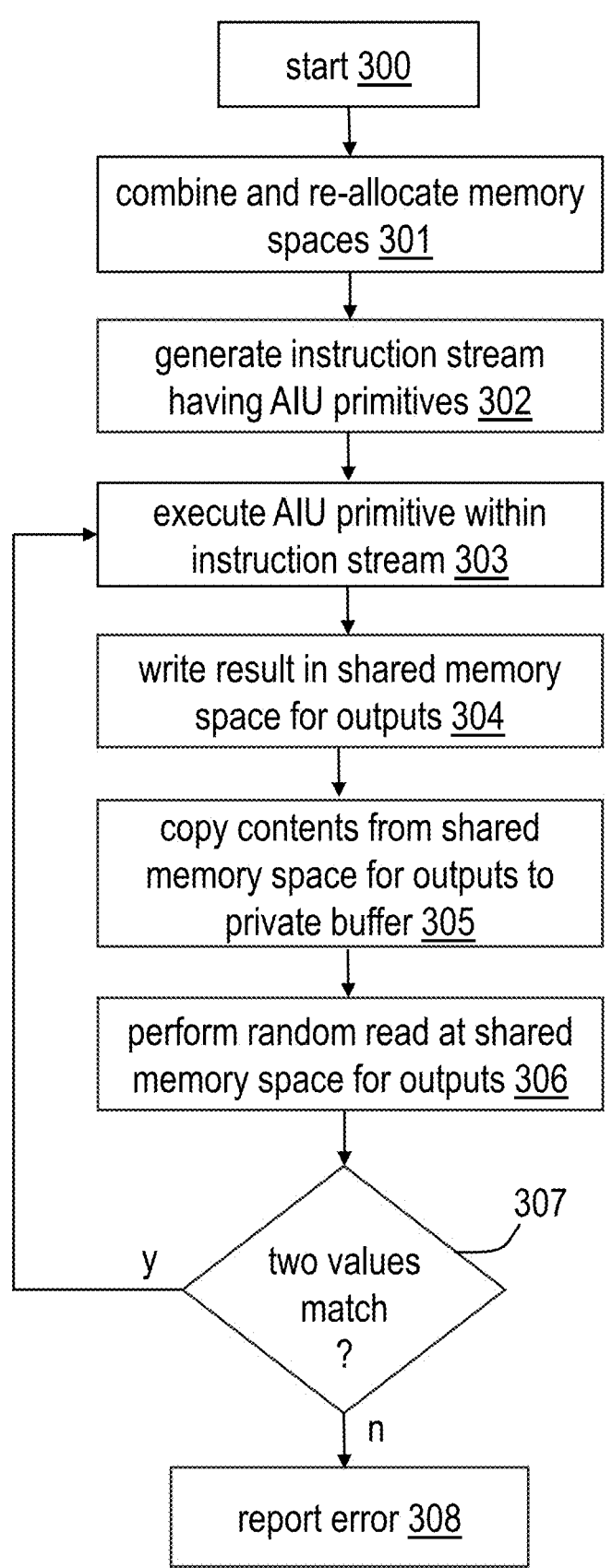
FIG. 3 is a flowchart of a method for testing the scenario shown in FIG. 2, according to one embodiment of the present invention.

Referring now to FIG. 3, there is illustrated a flowchart of a method for testing the scenario shown in FIG. 2, according to one embodiment of the present invention. Starting at block 300, the memories of data processing system 100 (from FIG. 1), such as caches 103*a*-103*c*, are combined and re-allocated as (1) a set of private buffers, (2) a shared memory space for inputs, and (3) a shared memory space for outputs, as shown in block 301. In this example, since data processing system 100 have three AIUs 102*a*-102*c* (with each AIU located in one of three processing chips 101*a*-101*c*), three private buffers are allocated, and each of the three private buffers can only be accessed by a corresponding one of AIUs 102*a*-102*c*. The two shared memory spaces can be accessed by any of AIUs 102*a*-102*c*. For example, any one of AIUs 102*a*-102*c* can read from the shared memory space for inputs, and any one of AIUs 102*a*-102*c* can write to the shared memory space for outputs. To make result prediction less complicated, only those AIUs that read from the shared memory space for inputs are allowed to write to shared memory space for outputs.

Figure 4A:
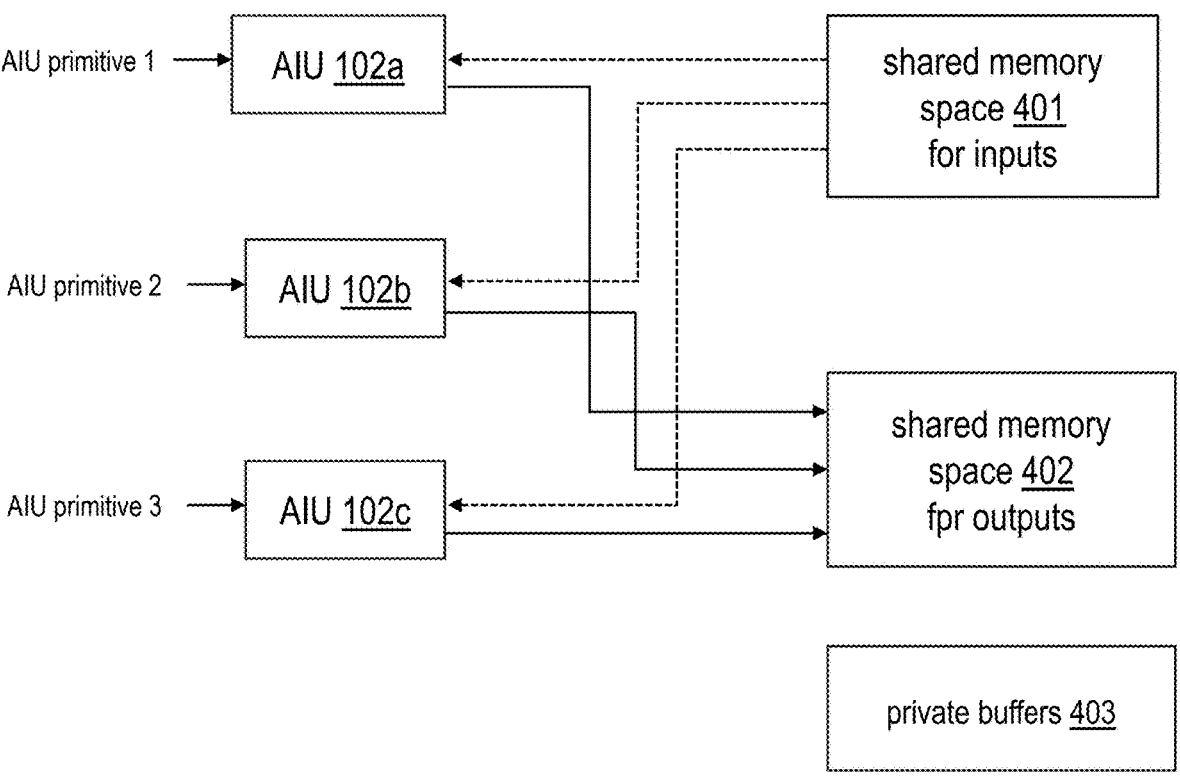
FIGS. 4A-4C depict various testing methodologies, according to one embodiment of the present invention.

In the embodiment shown in FIG. 4A, the memories includes shared memory space 401 for inputs (where any AIU can read from), shared memory space 402 for outputs (where any AIU can write on) and private buffers 403 that belong to instruction streams built for different processors. To make result prediction less complicated, only those AIUs that read from the shared buffer are allowed to write to the shared buffers.

Next, an instruction stream is generated for each processor cores, and each instruction stream may contain one or more AIU primitives, as depicted in block 302. In this example, since there is a total of 24 processor cores, 24 instruction streams will be generated, and each instruction stream may contain one or more AIU primitives. Preferably, the AIU primitives are randomly inserted in each instruction stream. In addition, more AIU primitives can be inserted into the instruction streams for the processor cores within, for example, processing chip 101*a* while instruction streams running on, for example, processing chip 101*b* will have less AIU primitives in order to force AIU 102*b* within processing chip 101*b* to become idle at times.

For each of the 24 processor cores, the instruction stream is executed, and the AIU primitives within the instruction streams will be executed by one of AIUs 102*a*-102*c*, as shown in block 303. AIU primitives may be executed on an AIU that can be located in the same (local) processing chip or on a separate (remote) processing chip. For example, AIU primitives may be executed on AIU 102*a* of processing chip 101*a* or on AIU 102*b* of processing chip 101*b*.

An AIU primitive is picked from an instruction stream, and this AIU primitive will be executed on one of AIUs 102*a*-102*c*. The result of the executions of the AIU primitive is written into the shared memory space for outputs (such as shared memory space 402 for outputs in FIG. 4A), as depicted in block 304. For example, after the execution of AIU primitive 1 on AIU 102*a*, the output of the AIU primitive is written to a memory location x of shared memory space 402 for outputs.

Next, the content stored in the memory location of the shared memory space for outputs (from block 304) is then copied to a private buffer reserved for the AIU that has executed the AIU primitive (such as one of private buffers 403 in FIG. 4A), as shown in block 305. Following the above-mentioned example, the content in memory location x within memory space 402 for outputs (from the execution of AIU primitive 1 on AIU 102*a*) is then copied to a memory location y of a private buffer reserved only for AIU 102*a*. The amount of data may vary from one instruction stream to another.

A read operation is randomly performed to read the data written into the shared memory space for outputs from block 304, as depicted in block 306. Following the above-mentioned example, the content in memory location x within memory space 402 for outputs (from the execution of AIU primitive 1 on AIU 102*a*) is read at a random time.

A determination is made whether or not the value in the memory location of the shared memory space for outputs from the random read (from block 306) matches the value in the memory location of the private buffer (from block 305), as shown in block 307. For the above-mentioned example, a determination is made whether or not the content stored in memory location x of the shared memory space 402 for outputs from the random read is the same as the content stored in memory location y of the private buffer reserved only for AIU 102*a*.

Theoretically, the two contents should be the same, but it is possible that one of AIU 102*a*-102*c* may write wrong data at location x such that the right data will be overwritten by the wrong data from AIU 102*a* or 102*c*.

If the value in the memory location x of the shared memory space 402 for outputs matches the value in the memory location y of the private buffer, the process returns to block 303. Otherwise, if the value in the memory location x of the shared memory space 402 for outputs does not match the value in the memory location y of the private buffer, an error is reported, as depicted in block 308.

Figure 4B:
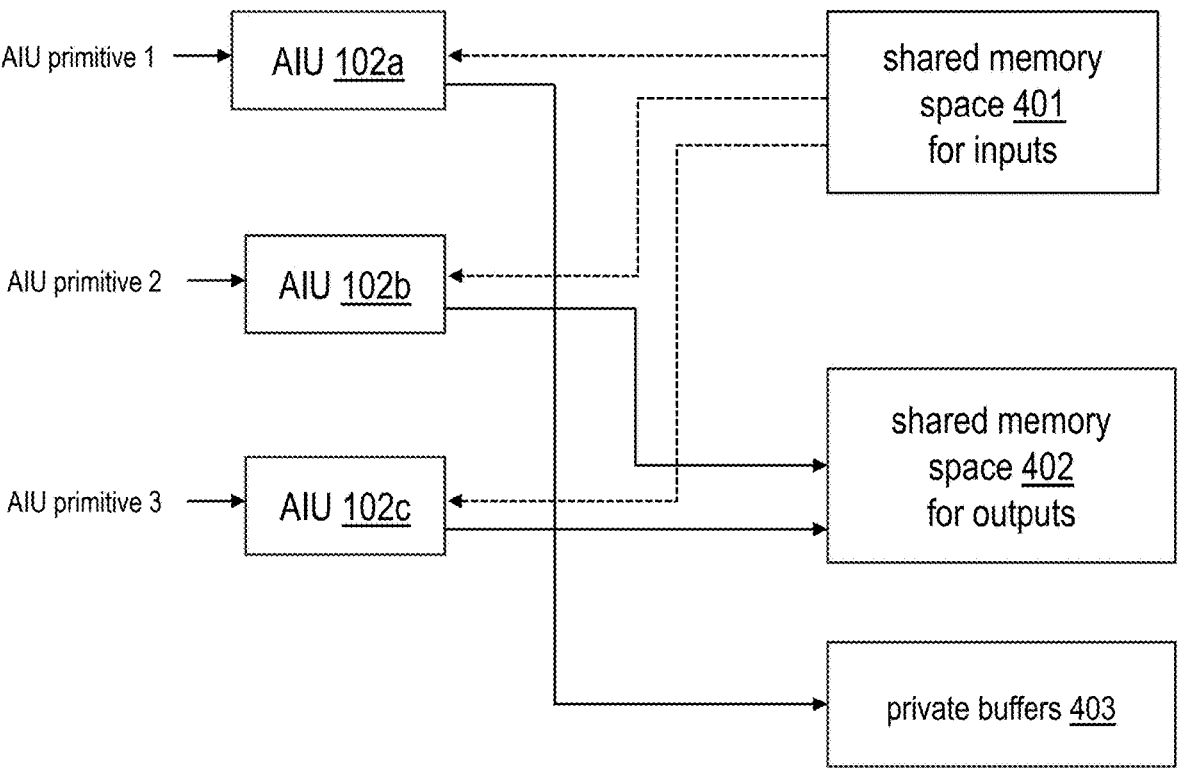
Figure 4C:
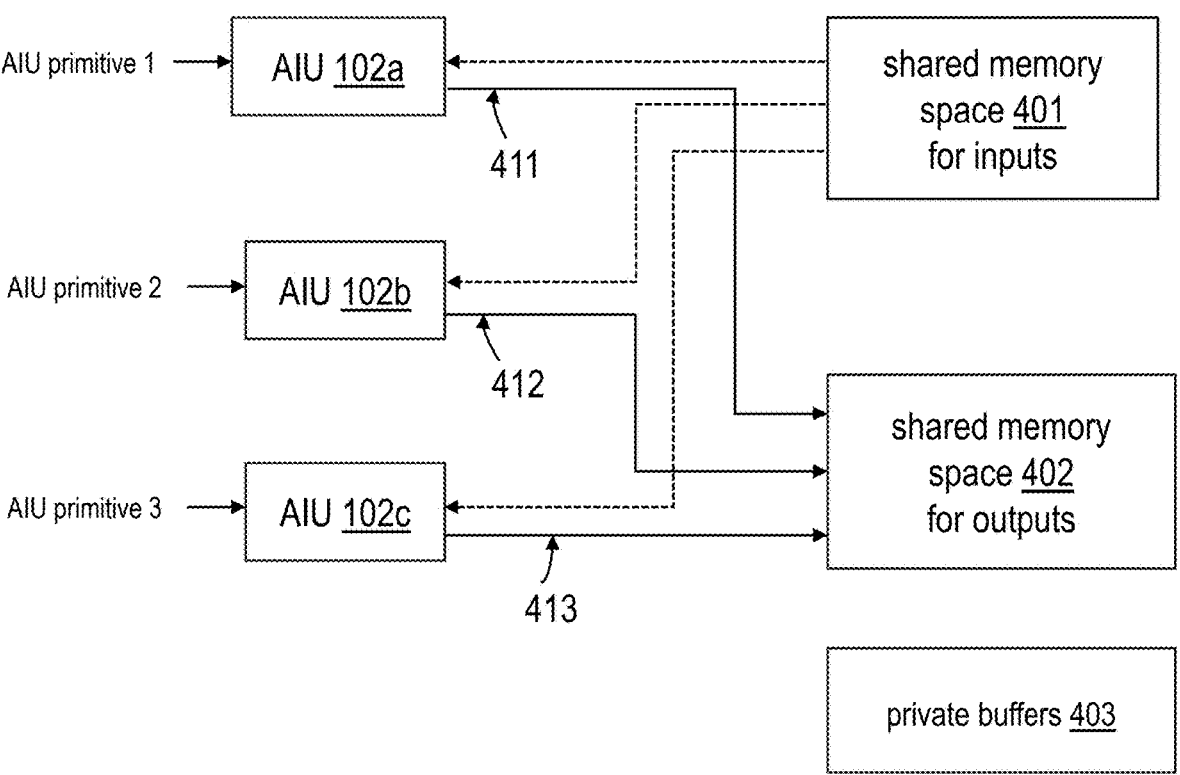

With reference now to FIGS. 4A-4C, there are depicted several testing methodologies, according to one embodiment of the present invention. FIG. 4A illustrates a case where multiple AIUs are set to access the same input and output buffers, while executing same function code with same or different dimensions (sizes). For example, AIUs 102*a*-102*c* are set to read from shared memory space 401 for inputs and write the results to shared memory space 402 for outputs, while executing same function code with same dimensions. It is expected that all produce the same results. Accessing shared memory spaces 401 and 402 creates contentions (i.e., buffer/cache contention).

The goal of creating shared memory spaces for AIU primitives 1-3 is to maximize contention among the processing chips in which instruction streams include AIU primitives 1-3. This method creates a two-level contention. The first contention is the competition among the processing chips to access idle. The second contention is the competition among the AIUs for the shared memory spaces.

FIG. 4B illustrates a case where multiple AIUs are set to access same input buffer but different output buffer, while executing same function code with same or different dimensions. For example, AIUs 102a-102c are set to read from shared memory space 401 for inputs but AIU 102a is set to write the results to private buffers 403, and AIUs 102b-102c are set to write the results to shared memory space 402 for outputs, while executing same function code with the same dimensions. It is expected that all should produce the same results. Accessing same shared memory space (buffers) creates contentions among AIUs 102a-102c as well as processing chips 101a-101c that utilize AIUs 102a-102c, respectively.

FIG. 4C illustrates a case where the outputs of AIU primitives 1-3 are written to a shared output buffer, and the outputs have different sizes. For example, outputs 411-413 of AIUs 102a-102c, respectively, are written to shared memory space 402 for outputs, and outputs 411-413 have different sizes. In this example, output 411 is a superset for all outputs 411-413, and no matter the order in which AIU primitives 1-3 were executed, the final result should be the one in output 411.

When the AIU primitives have different dimensions, extra test case setup as well as test case result observations are needed. In this case, instead of analyzing the output buffer as a single unit, it will be necessary to do the analysis in smaller units. The test case build process must perform extra steps to choose when to build outputs with different sizes. The test case build process also has to assure that various units of outputs are predictable.

Figure 5:
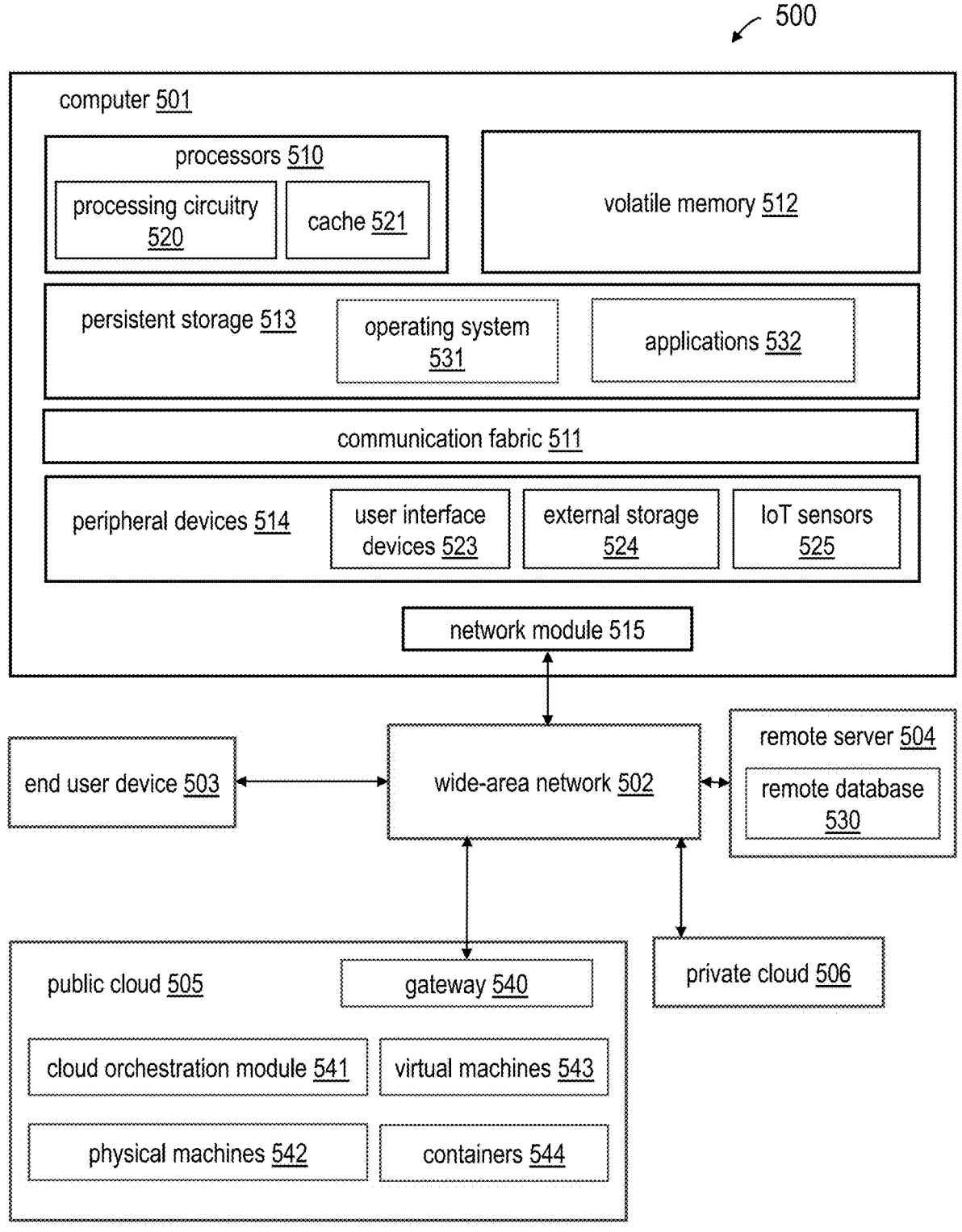
FIG. 5 is a block diagram of a computing environment in which an embodiment of present invention can be executed.

Referring now to FIG. 5, there is illustrated a block diagram of a computing environment in which an embodiment of present invention can be executed. As shown, a computing environment 500 contains an example of an environment for the execution of at least some of the computer code involved in performing the inventive methods, such as a method for testing AIUs located across separate processing chips via code of one of applications 532. Computing environment 500 also includes, for example, computer 501, wide-area network (WAN) 502, end user device (EUD) 503, remote server 504, public cloud 505, and private cloud 506. In this embodiment, computer 501 includes processor 510 having processing circuitry 520 and cache 521, communication fabric 511, volatile memory 512, persistent storage 513 (including operating system 531 and applications 532), peripheral devices 514 (including user interface devices 523, and Internet of Things (IoT) sensors 525), and network module 515. Public cloud 505 includes a gateway 540, a cloud orchestration module 541, physical machines 542, virtual machines 543, and containers 544.

Computer 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud. On the other hand, computer 501 is not required to be in a cloud except to any extent as may be affirmatively indicated.

Processors 510 includes one or more processing elements of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processors 510. Cache memories are typically organized into multiple levels depending upon relative proximity to the processing circuitry. Alternatively, some, or all, of the cache for the processor set may be located off chip. In some computing environments, processors 510 may be designed for working with qubits and performing quantum computing.

Computer readable program instructions are typically loaded onto computer 501 to cause a series of operational steps to be performed by processors 510 of computer 501 and thereby effect a computer-implemented method, such that the instructions thus executed will instantiate the methods specified in flowcharts and/or narrative descriptions of computer-implemented methods included in this document (collectively referred to as the inventive methods). These computer readable program instructions are stored in various types of computer readable storage media, such as cache 521 and the other storage media discussed below. The program instructions, and associated data, are accessed by processors 510 to control and direct performance of the inventive methods. In computing environment 500, at least some of the instructions for performing the inventive methods may be stored as applications 532 within persistent storage 513.

Communication fabric 511 is the signal conduction paths that allow the various components of computer 501 to communicate with each other. This fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 512 is any type of volatile memory now known or to be developed in the future. Examples include dynamic type random-access memory (RAM) or static type RAM. Volatile memory 512 is characterized by random access, but this is not required unless affirmatively indicated. In computer 501, volatile memory 512 is located in a single package and is internal to computer 501, but, alternatively or additionally, volatile memory 512 may be distributed over multiple packages and/or located externally with respect to computer 501.

Persistent storage 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read-only memory (ROM), but typically at least a portion of the persistent storage allows writing of data, deletion of data and re-writing of data. Some familiar forms of persistent storage include magnetic disks and solid state storage devices. Operating system 531 may take several forms, such as various known proprietary operating systems or open source Portable Operating System Interface type operating systems that employ a kernel. The code included in applications 532 includes at least some of the computer code involved in performing the inventive methods.

Peripheral devices 514 include the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, user interface (UI) devices 523 may include components such as a display screen, speaker, microphone, wearable devices (such as goggles and smart watches), keyboard, mouse, printer, touchpad, game controllers, and haptic devices. External storage 524 can be an external hard drive, or insertable storage, such as an SD card. External storage 524 may be persistent and/or volatile. In some embodiments, external storage 524 may take the form of a quantum computing storage device for storing data in the form of qubits. In embodiments where computer 501 is required to have a large amount of storage (for example, where computer 501 locally stores and manages a large database), then this storage may be provided by peripheral storage devices designed for storing very large amounts of data, such as a storage area network (SAN) that is shared by multiple, geographically distributed computers. IoT sensors 525 are made up of sensors that can be used in Internet-of-Things applications. For example, one sensor may be a thermometer and another sensor may be a motion detector.

Network module 515 is the collection of computer software, hardware, and firmware that allows computer 501 to communicate with other computers through WAN 502. Network module 515 may include hardware, such as modems or WiFi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can be downloaded to computer 501 from an external computer or external storage device through a network adapter card or network interface included within network module 515.

WAN 502 is any wide-area network (for example, the internet) capable of communicating computer data over non-local distances by any technology for communicating computer data, now known or to be developed in the future. In some embodiments, WAN 502 may be replaced and/or supplemented by local-area networks (LANs) designed to communicate data between devices located in a local area, such as a WiFi network. The WAN and/or LANs typically include computer hardware such as copper transmission cables, optical transmission fibers, wireless transmission, routers, firewalls, switches, gateway computers and edge servers.

End user device (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 115 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

Remote server 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from a remote database of a remote server 504.

Public cloud 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machines 542, which is the universe of physical computers in and/or available to public cloud 505. Virtual computing environments (VCEs) typically take the form of virtual machines from virtual machines 543 and/or containers from containers 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is a collection of computer software, hardware, and firmware that allows public cloud 505 to communicate through WAN 502.

Private cloud 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

As has been described, the present invention provides an improved method and system for testing the function codes that are utilized to perform the execution of multiple AIU primitives in multiple AIUs located in separate chips.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, RAM, ROM, erasable programmable read-only memory (EPROM), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

While the invention has been particularly shown and described with reference to a preferred embodiment, it will be understood by those skilled in the art that various changes in form and detail may be made therein without departing from the spirit and scope of the invention.

What is claimed is:

1. A computer-implemented method comprising:
associating a testing system to a first and second processing chips, wherein said first processing chip includes a first artificial intelligence unit (AIU) and a first set of processors, and said second processing chip includes a second AIU and a second set of processors;

combining and re-allocating memories of said first and second processing chips as a set of private buffers, a shared memory space for inputs, and a shared memory space for outputs;

generating an instruction stream for said first and second processing chips with each instruction stream containing one or more AIU primitives;

executing one of said AIU primitives within said instruction streams in one of said first and second AIUs;

writing results of said executions of said one AIU primitive into a first location of said shared memory space for outputs;

copying contents stored in said first location of said shared memory space for outputs to a second location of one of said private buffer reserved for said AIU that has executed said one AIU primitive;

reading contents in said first location of said shared memory space for outputs at a random time;

determining whether or not said read contents in said first location of said shared memory space for outputs matches said contents stored in said second location of said one private buffer; and in response to said read contents in said first location of said shared memory space for outputs not matching said contents stored in said second location of said one private buffer, flagging an error.

2. The method of claim 1, further comprising in response to said read contents in said first location of said shared memory space for outputs matching said contents stored in said second location of said one private buffer, returning to said executing step.

3. The method of claim 1, wherein said second processing chip has less AIU primitives than said first processing chip in order to force said second AIU within said second processing chip to become idle at times.

4. The method of claim 1, wherein said first and second AIUs are set to read from said shared memory space for inputs and to write to said shared memory space for outputs.

5. The method of claim 4, wherein said first and second AIUs execute same function code with same or different dimensions.

6. The method of claim 1, wherein said first and second AIUs are set to read from said shared memory space for inputs, and said first AIU is set to write to one of said private buffers while said second AIU is set to write to said shared memory space for outputs.

7. The method of claim 6, wherein information in said one private buffer is compared to information in said shared memory space for outputs.

8. The method of claim 6, wherein said first and second AIUs execute same function code with same or different dimensions.

9. The method of claim 1, wherein said first AIU is to write to a first one of said private buffers and said second AIU is set to write to a second one of said private buffers.

10. The method of claim 8, wherein an AIU primitive output from said first AIU is larger than an AIU primitive output from said second AIU.

11. A computer program product for testing artificial intelligence units located across separate processing chips, said computer program product comprising a computer readable storage medium having program instructions embodied therein, said program instructions executable by a computer to cause said computer to perform:

associating a testing system to a first and second processing chips, wherein said first processing chip includes a first artificial intelligence unit (AIU) and a first set of processors, and said second processing chip includes a second AIU and a second set of processors;

combining and re-allocating memories of said first and second processing chips as a set of private buffers, a shared memory space for inputs, and a shared memory space for outputs;

generating an instruction stream for said first and second processing chips with each instruction stream containing one or more AIU primitives;

executing one of said AIU primitives within said instruction streams in one of said first and second AIUs;

writing results of said executions of said one AIU primitive into a first location of said shared memory space for outputs;

copying contents stored in said first location of said shared memory space for outputs to a second location of one of said private buffer reserved for said AIU that has executed said one AIU primitive;

reading contents in said first location of said shared memory space for outputs at a random time;

determining whether or not said read contents in said first location of said shared memory space for outputs matches said contents stored in said second location of said one private buffer; and in response to said read contents in said first location of said shared memory space for outputs not matching said contents stored in said second location of said one private buffer, flagging an error.

12. The computer program product of claim 11, further comprising in response to said read contents in said first location of said shared memory space for outputs matching said contents stored in said second location of said one private buffer, returning to said executing step.

13. The computer program product of claim 11, wherein said second processing chip has less AIU primitives than said first processing chip in order to force said second AIU within said second processing chip to become idle at times.

14. The computer program product of claim 11, wherein said first and second AIUs are set to read from said shared memory space for inputs and write to said shared memory space for outputs.

15. The computer program product of claim 14, wherein said first and second AIUs execute same function code with same or different dimensions.

16. The computer program product of claim 11, wherein said first and second AIUs are set to read from said shared memory space for inputs, and said first AIU is set to write to one of said private buffers while said second AIU is set to write to said shared memory space for outputs.

17. The computer program product of claim 16, wherein information in said one private buffer is compared to information in said shared memory space for outputs.

18. The computer program product of claim 16, wherein said first and second AIUs execute same function code with same or different dimensions.

19. The computer program product of claim 11, wherein said first AIU is to write to a first one of said private buffers and said second AIU is set to write to a second one of said private buffers.

20. The computer program product of claim 11, wherein an AIU primitive output from said first AIU is larger than an AIU primitive output from said second AIU.

* * * * *